(12) United States Patent
Ambroladze et al.

(10) Patent No.: US 8,522,076 B2
(45) Date of Patent: Aug. 27, 2013

(54) ERROR DETECTION AND RECOVERY IN A SHARED PIPELINE

(75) Inventors: Ekaterina M. Ambroladze, Wappingers Falls, NY (US); Deanna Postles Dunn Berger, Poughkeepsie, NY (US); Michael Fee, Cold Spring, NY (US); Arthur J. O'Neill, Jr., Poughkeepsie, NY (US); Diana Lynn Orf, Somerville, MA (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/821,871

(22) Filed: Jun. 23, 2010

(65) Prior Publication Data

US 2011/0320855 A1 Dec. 29, 2011

(51) Int. Cl.
*G06F 11/00* (2006.01)

(52) U.S. Cl.
USPC .............. 714/10; 714/11; 714/15; 714/48; 714/49

(58) Field of Classification Search
USPC .................................... 714/10, 11, 15, 48, 49
See application file for complete search history.

(56) References Cited

U.S. PATENT DOCUMENTS

| | | | | |
|---|---|---|---|---|
| 5,179,680 A * | 1/1993 | Colwell et al. | 711/125 |
| 5,625,834 A * | 4/1997 | Nishikawa | 712/9 |
| 6,385,755 B1 * | 5/2002 | Shimomura et al. | 714/819 |
| 6,496,925 B1 * | 12/2002 | Rodgers et al. | 712/244 |
| 6,684,346 B2 * | 1/2004 | Tu et al. | 714/11 |
| 7,055,060 B2 * | 5/2006 | Nguyen et al. | 714/11 |
| 7,131,125 B2 * | 10/2006 | Modelski et al. | 718/106 |
| 7,134,047 B2 * | 11/2006 | Quach | 714/11 |
| 7,353,445 B1 * | 4/2008 | Barreh et al. | 714/758 |
| 7,464,208 B2 * | 12/2008 | Tu et al. | 710/200 |
| 7,711,955 B1 * | 5/2010 | Olson et al. | 713/168 |
| 7,979,644 B2 * | 7/2011 | Sugizaki et al. | 711/146 |
| 8,266,496 B2 * | 9/2012 | Flynn et al. | 714/758 |
| 2002/0083243 A1 * | 6/2002 | Van Huben et al. | 710/107 |
| 2003/0023932 A1 * | 1/2003 | Arndt et al. | 714/805 |
| 2004/0019771 A1 * | 1/2004 | Quach | 712/229 |
| 2004/0123201 A1 * | 6/2004 | Nguyen et al. | 714/736 |
| 2007/0226589 A1 * | 9/2007 | Maiyuran et al. | 714/763 |
| 2008/0250271 A1 * | 10/2008 | Ozer et al. | 714/15 |
| 2009/0019306 A1 * | 1/2009 | Hum et al. | 714/2 |
| 2009/0044049 A1 * | 2/2009 | Luick | 714/11 |
| 2009/0119464 A1 | 5/2009 | Grundy et al. | |
| 2009/0240977 A1 | 9/2009 | Prasky et al. | |
| 2009/0271676 A1 * | 10/2009 | Biswas et al. | 714/733 |
| 2010/0050026 A1 * | 2/2010 | Okabe | 714/48 |
| 2010/0125750 A1 * | 5/2010 | Moyer et al. | 714/5 |
| 2010/0131796 A1 * | 5/2010 | Engelbrecht et al. | 714/15 |
| 2010/0268987 A1 * | 10/2010 | Clark et al. | 714/16 |
| 2011/0161534 A1 * | 6/2011 | Brandstaetter et al. | 710/104 |

\* cited by examiner

*Primary Examiner* — Loan L. T. Truong
(74) *Attorney, Agent, or Firm* — Cantor Colburn LLP; John Campbell

(57) ABSTRACT

A pipelined processing device includes: a processor configured to receive a request to perform an operation; a plurality of processing controllers configured to receive at least one instruction associated with the operation, each of the plurality of processing controllers including a memory to store at least one instruction therein; a pipeline processor configured to receive and process the at least one instruction, the pipeline processor including shared error detection logic configured to detect a parity error in the at least one instruction as the at least one instruction is processed in a pipeline and generate an error signal; and a pipeline bus connected to each of the plurality of processing controllers and configured to communicate the error signal from the error detection logic.

20 Claims, 9 Drawing Sheets

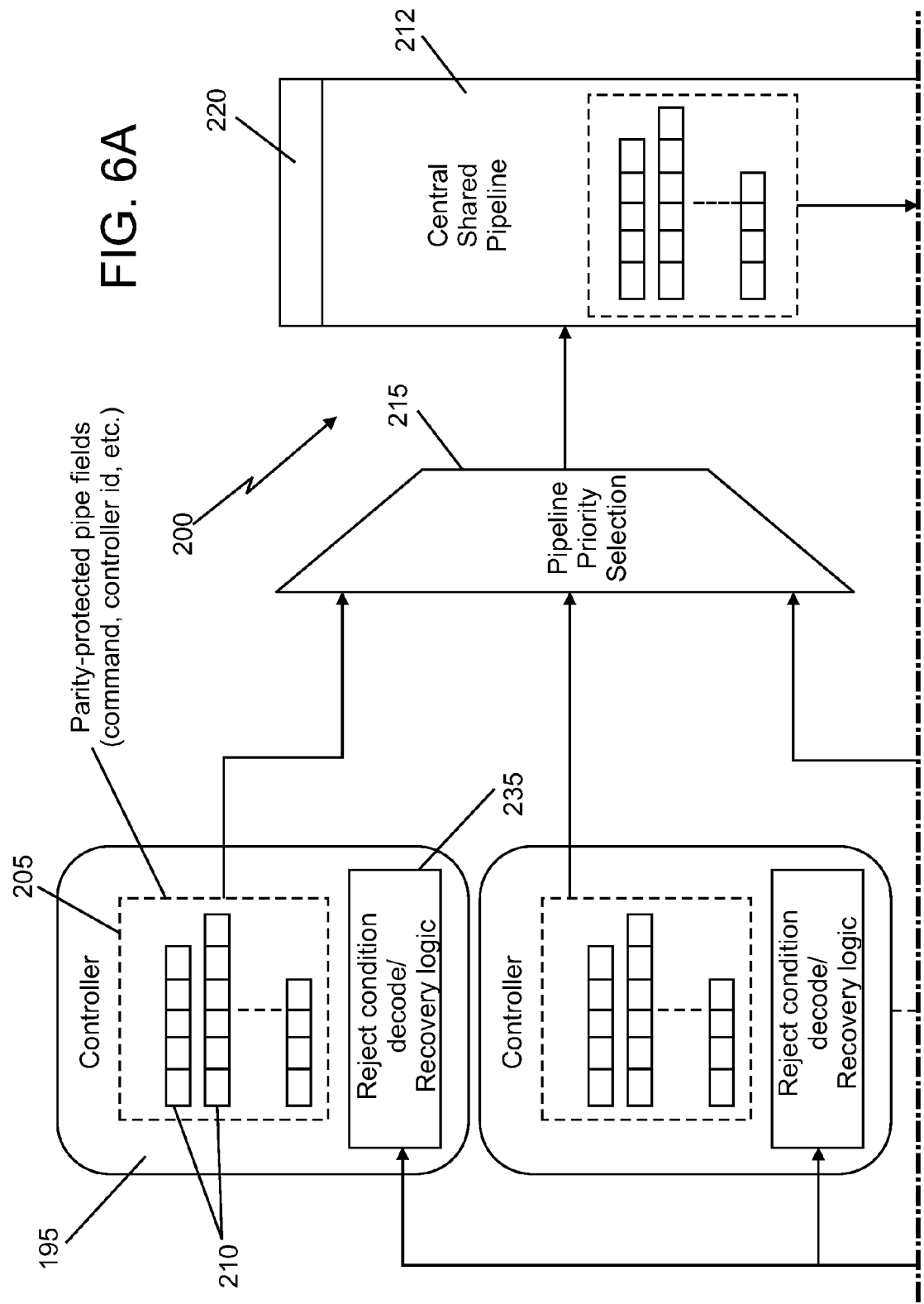

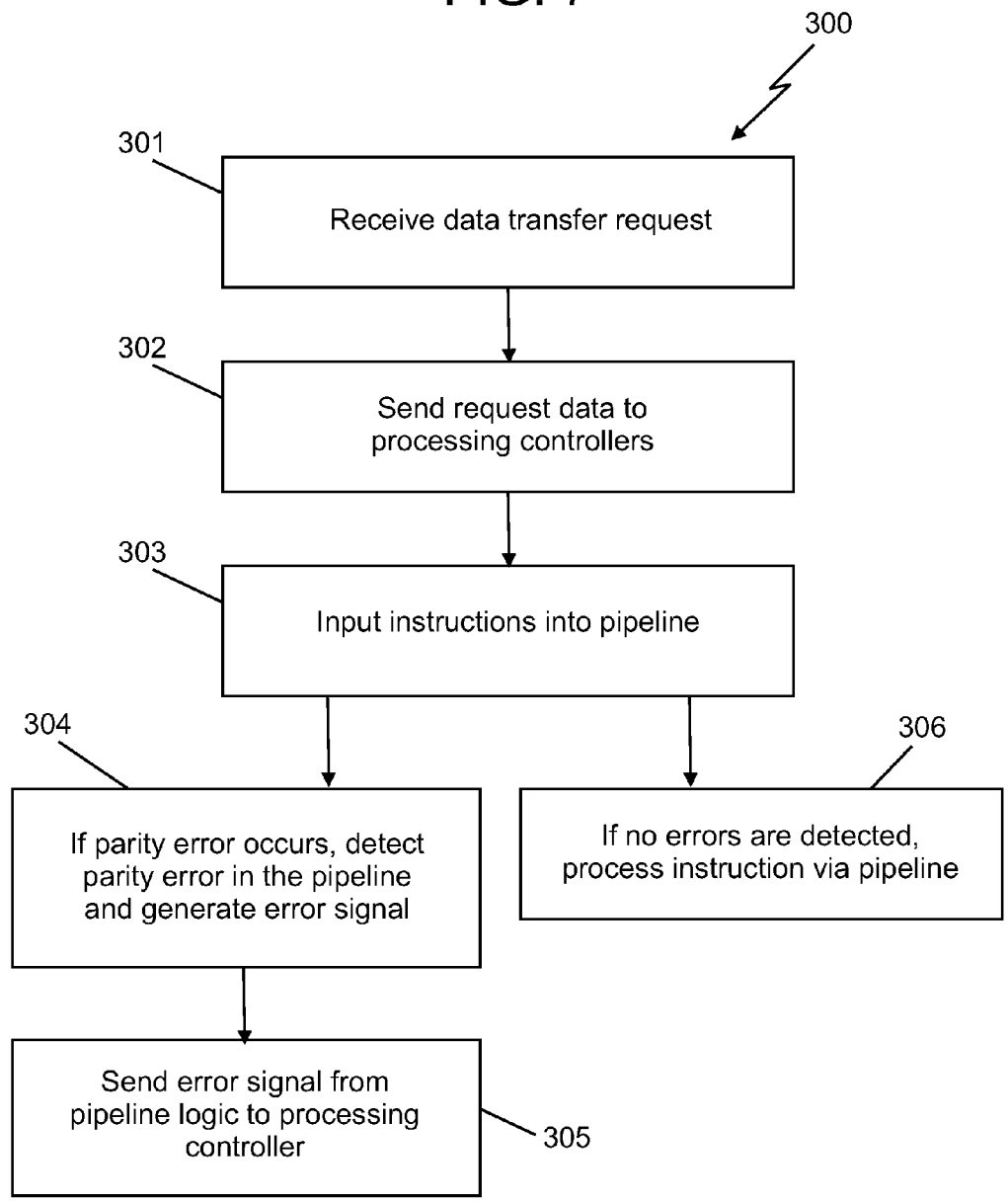

ERROR DETECTION AND RECOVERY IN A SHARED PIPELINE

BACKGROUND

Exemplary embodiments relate generally to pipelined data transfer operations, and particularly to systems and methods for monitoring performance in a shared pipeline.

In computing, a pipeline may be considered as a set of data processing elements connected in series, so that the output of one element is the input of the next one. The elements of a pipeline are often executed in parallel or in time-sliced fashion; in that case, some amount of buffer storage is often inserted between elements.

Further, an instruction pipeline is a technique used in the design of computers and other digital electronic devices to increase their instruction throughput (the number of instructions that can be executed in a unit of time). Pipelining involves splitting the processing of a computer instruction into a series of independent steps, with storage at the end of each step. This allows the computer's control circuitry to issue instructions at the processing rate of the slowest step, which is much faster than the time needed to perform all steps at once.

In a system utilizing a shared pipeline, commands are processed by a variety of controllers which take turns accessing the shared pipeline. Each controller contains many registers containing information about the type and state of the command. Each controller may also contain error checking and recovery logic for every field it presents to the shared pipeline. When a parity error was detected on a field within a controller, the controller could take appropriate recovery action. However, parity errors detected in the shared pipeline are generally not recoverable, and thus such parity errors could result in the most extreme and undesirable recovery action—system checkstop.

BRIEF SUMMARY

An exemplary embodiment includes a pipelined processing device. The device includes: a processor configured to receive a request to perform an operation; a plurality of processing controllers configured to receive at least one instruction associated with the operation, each of the plurality of processing controllers including a memory to store at least one instruction therein; a pipeline processor configured to receive and process the at least one instruction, the pipeline processor including shared error detection logic configured to detect a parity error in the at least one instruction as the at least one instruction is processed in a pipeline and generate an error signal; and a pipeline bus connected to each of the plurality of processing controllers and configured to communicate the error signal from the error detection logic.

Another exemplary embodiment includes a method of pipeline processing. The method includes: receiving a request to perform an operation at a processor; sending at least one instruction associated with the operation to each of a plurality of processing controllers, each of the plurality of processing controllers including a memory to store at least one instruction therein; receiving and processing the at least one instruction via a pipeline processor; detecting a parity error occurring in the at least one instruction as the at least one instruction is processed in a pipeline by shared error detection logic; generating an error signal indicating the parity error in the error detection logic and sending the error signal to a processing controller associated with the instruction via a pipeline bus.

Another exemplary embodiment includes a computer program product for pipeline processing. The computer program product includes a tangible storage medium readable by a processing circuit and storing instructions for execution by the processing circuit for performing a method including: receiving a request to perform an operation at a processor; sending at least one instruction associated with the operation to each of a plurality of processing controllers, each of the plurality of processing controllers including a memory to store at least one instruction therein; receiving and processing the at least one instruction via a pipeline processor; detecting a parity error occurring in the at least one instruction as the at least one instruction is processed in a pipeline by shared error detection logic; and generating an error signal indicating the parity error in the error detection logic and sending the error signal to a processing controller associated with the instruction via a pipeline bus.

Additional features and details are realized through the techniques of the present invention. Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF THE SEVERAL VIEWS OF THE DRAWINGS

Referring now to the drawings wherein like elements are numbered alike in the several FIGURES:

FIGS. 6A-6B (collectively referred to as FIG. 6) depicts a pipelined processing device including a processing device and a plurality of controllers;

FIG. 7 depicts a method of pipeline processing a requested operation; and

DETAILED DESCRIPTION

The systems and methods described herein provide a mechanism for detecting errors in a pipeline and alerting appropriate controllers. A pipeline processing system includes a centralized or shared logic that is configured to detect parity errors in an instruction in the pipeline. This error detection logic is connected to each controller via a bus or other communication device, and can communicate error signals to the individual controller(s) associated with the instruction. In one embodiment, the error detection logic is configured to generate encoded error signals that indicate a type of error. A method includes communicating errors detected in the central or shared pipeline logic to a requesting controller so that the controller may initiate an appropriate recovery action. The systems and methods described herein allow for many errors to be detected in a pipeline and addressed by individual controllers without requiring system wide action such as system checkstop.

Figure 1:
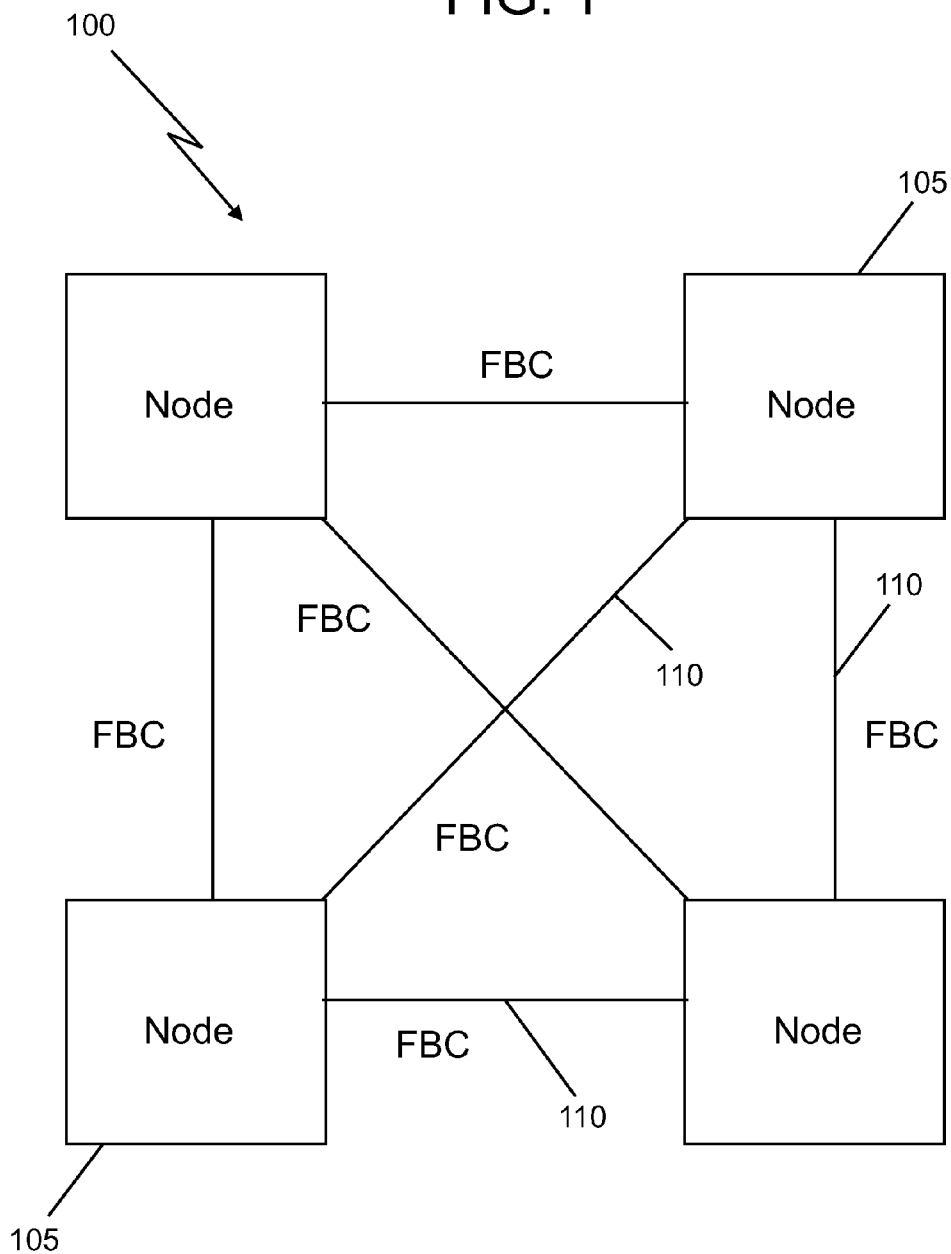
FIG. 1 depicts an exemplary embodiment of a computing, processing and/or data management network.

FIG. 1 illustrates an exemplary embodiment of a computing, processing and/or data management system 100 such as a storage area network. The system 100 includes multiple nodes 105 connected in communication with one another via suitable connectors 110 such as wires, cables and optical fibers. The nodes 105 may be any processing and/or storage system such as a computer, server, data center, cache system or mainframe computer. The connectors 110 may include any of various connectors, ports, switches and other devices, and with the nodes 105 form a network or fabric. In the embodiment shown in FIG. 1, the connectors 110 are configured as fabric connectors (FBC).

Figure 2:
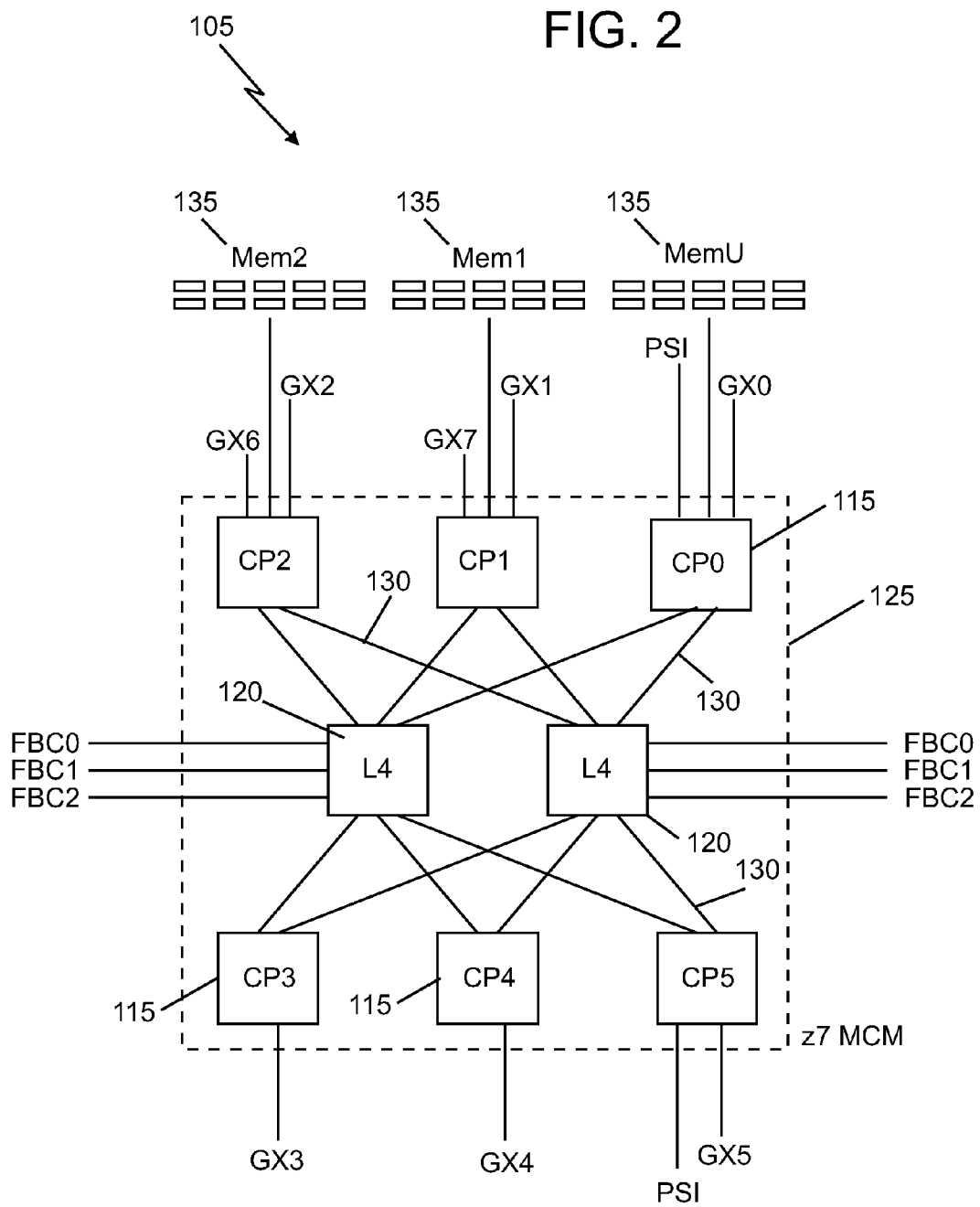
FIG. 2 depicts a data storage system in accordance with exemplary embodiments.

FIG. 2 illustrates an exemplary data storage system having a cache topology that may form all or part of a node 105. A plurality of central processors (CP) 115 (also referred to as central processing units) are operatively connected via busses to one or more level 4 (L4) caches 120. In one embodiment, the CPs 115 and the L4 caches 120 are integrated in a package such as a multi-chip module (MCM) 125 and connected via conductors 130. In one example, the MCM 125 is a component of a data center, mainframe, server or other data storage device. In this embodiment, the MCM 125 may be connected to memory devices 135 such as disk drives or tape drives. The MCM 125 may also be connected in communication with other nodes 105 via fabric connectors, channels and/or other connectors 110. The central processors and caches are not limited to the embodiments described herein, and may be any type of processing and/or storage component such as a microprocessor, memory area and/or logical entity.

Figure 3:
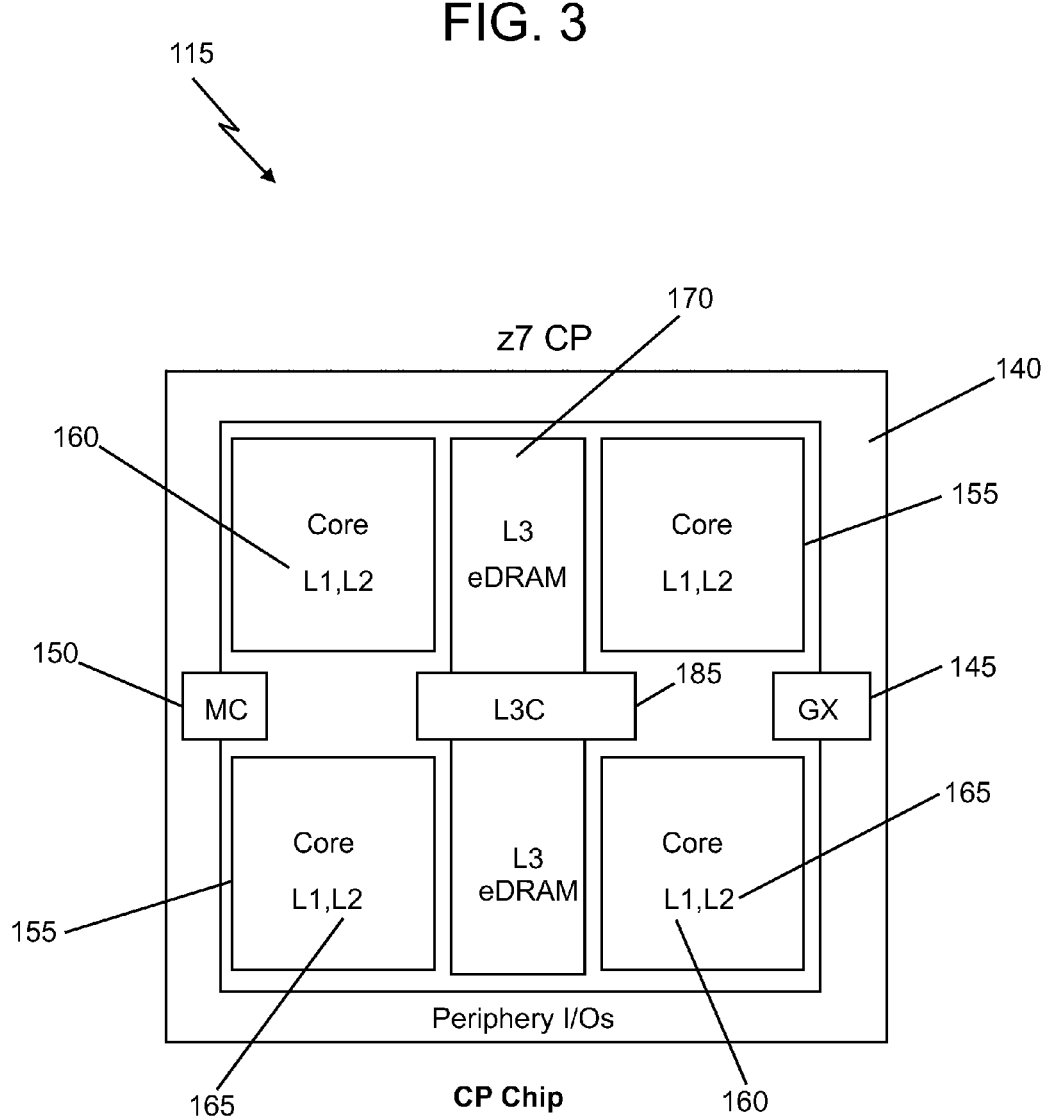
FIG. 3 depicts an exemplary embodiment of a processor of the data storage system of FIG. 2.
Figure 4:
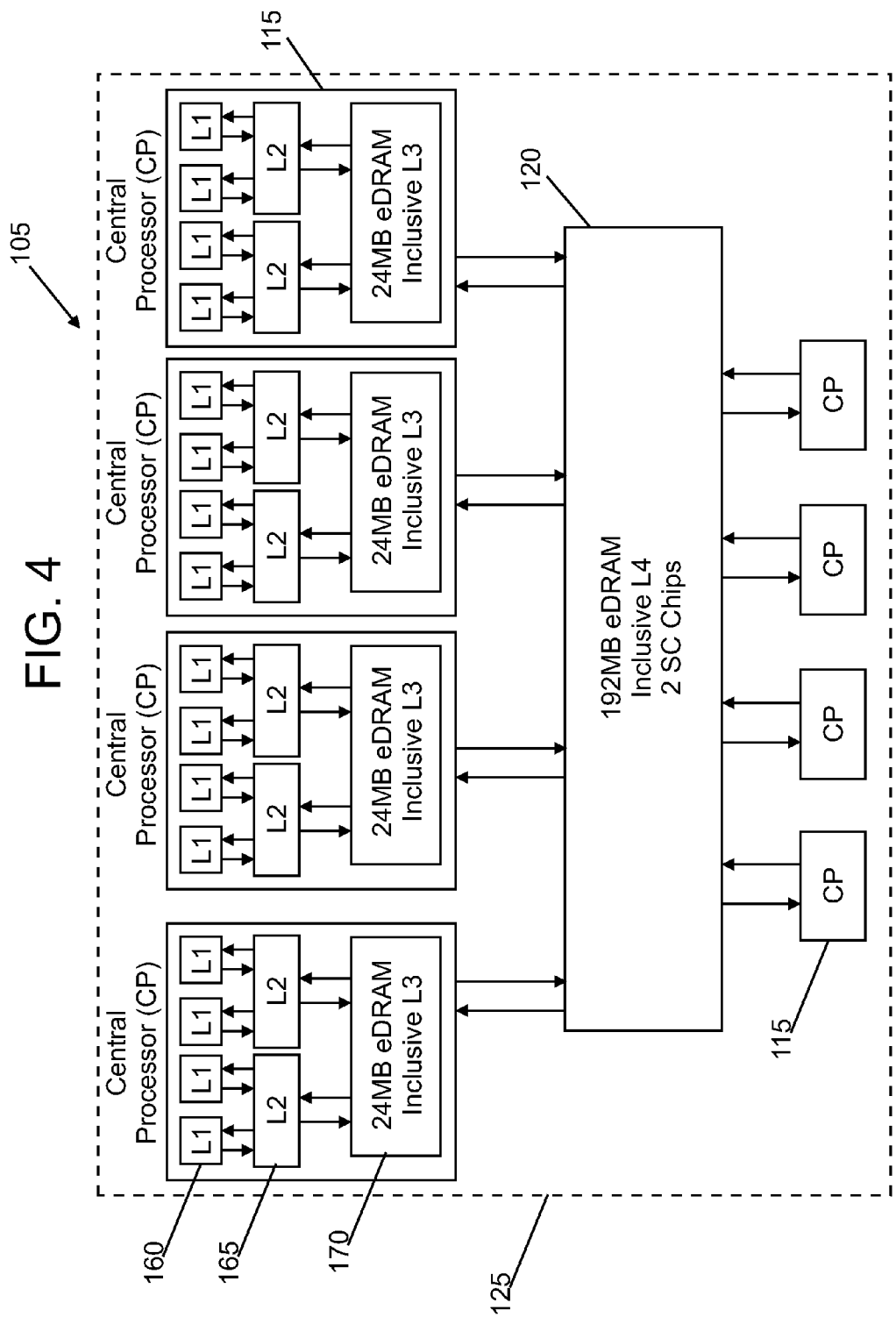
FIG. 4 depicts a block diagram showing components of the data storage system of FIG. 2.

Referring to in FIGS. 3 and 4, the CP 115 may include additional components to facilitate functions such as processing, communication and data transfer, such as I/O devices 140 which may include input devices (or peripherals) and/or output devices (or peripherals), an I/O port 145 and a memory controller unit 150. The I/O devices 140 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 140 also include components for communicating over various networks, such as the Internet or an intranet.

In one embodiment, each of the central processors (CP) 115 includes one or more cores 155 which perform the reading and executing of instructions. On each central processor (CP) 105, the cores 155 are operatively connected via busses to one or more level 1 (L1) caches 160, one or more level 2 (L2) caches 165, and at least one level 3 (L3) cache 170 as understood by one skilled in the art. The L1 caches 160 are physically closest to the cores 155, followed by the L2 caches 165, and then the L3 caches 170. In the example shown in FIG. 3, each individual central processor 115 is fabricated on its own separate chip which includes the L1 caches 160, the L2 caches 165, and the L3 caches 170, and the L4 caches 120 are fabricated on their own separate chips. Although the L3 caches 170 and the L4 caches 120 are shown as including embedded dynamic random access memory (DRAM), which is referred to as eDRAM, it is understood that any other types of suitable memory such as DRAM may be utilized.

Figure 5:
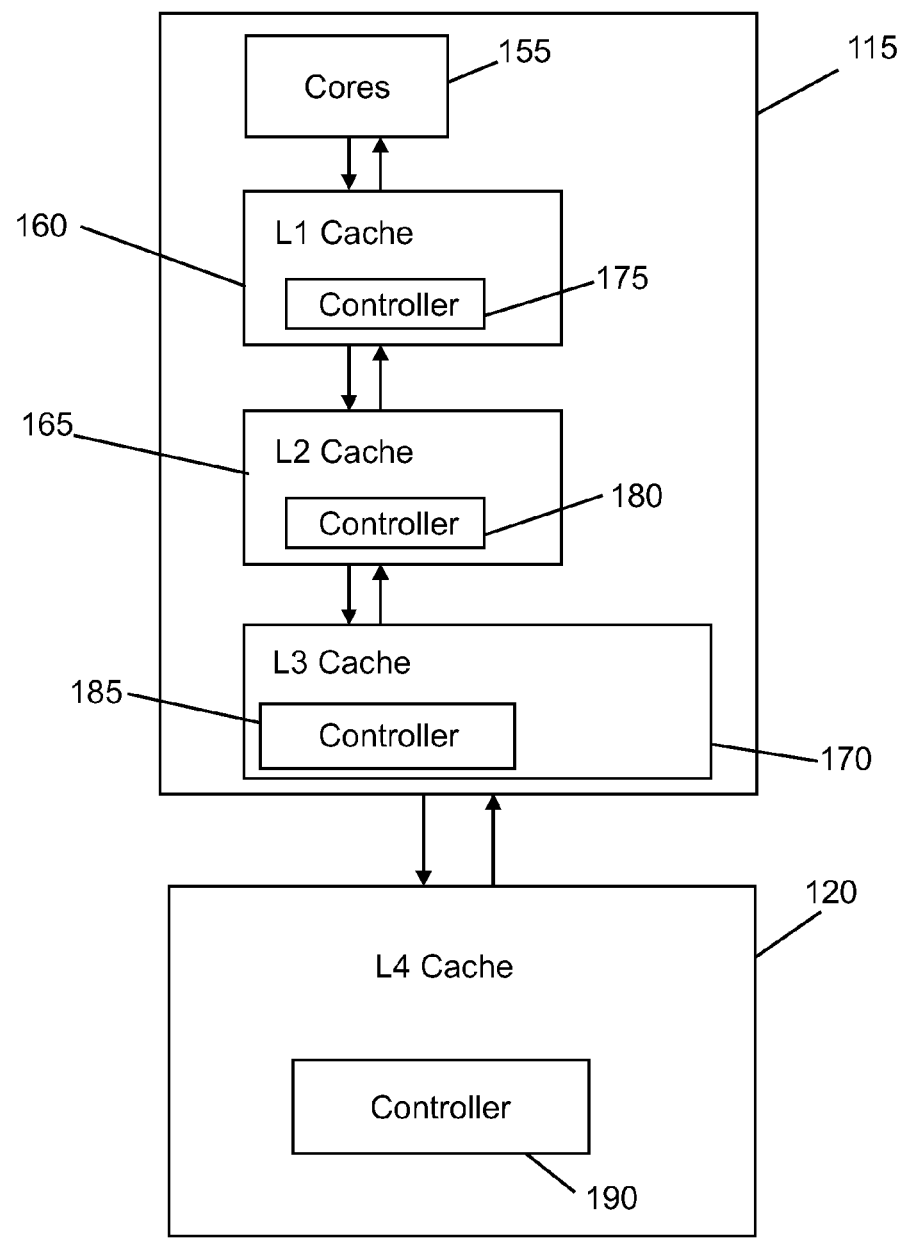
FIG. 5 depicts a block diagram showing components of the data storage system of FIG. 2.

Referring to FIG. 5, in one embodiment, one or more of the L1 caches 160, the L2 caches 165, the L3 cache 170 and the L4 caches 120 include their own respective cache controllers 175, 180, 185 and 190 for controlling various operations such as sending, receiving, and executing requests (also referred to as request signals).

Figure 6B:
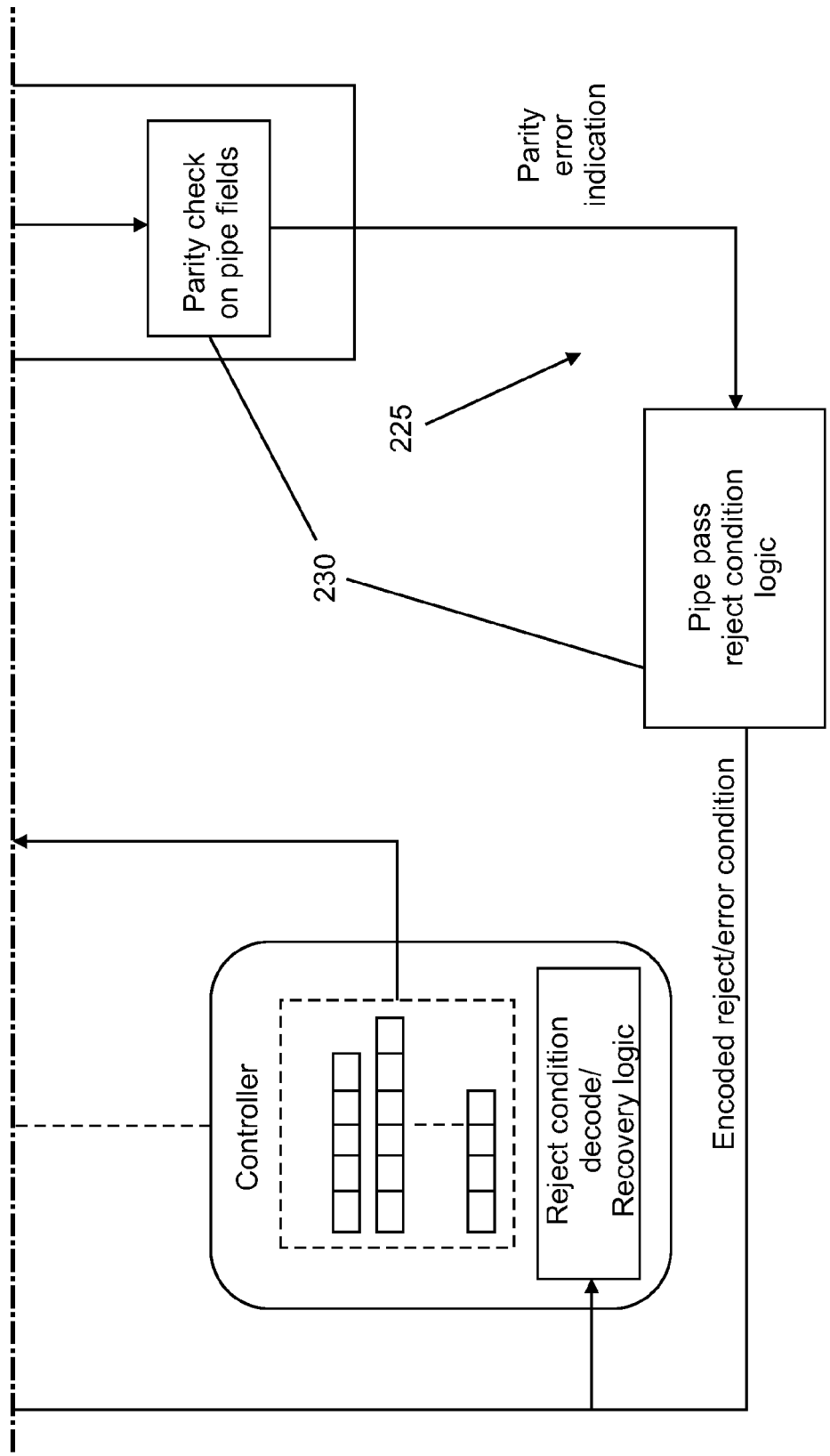

An embodiment of a processing system is shown in FIG. 6. Although this embodiment is described in conjunction with the L3 cache 170, the embodiment is not so limited. The processing system may be cache such as the L1 cache 160, the L2 cache 165, the L4 cache 120, or any other data storage, transfer and/or processing device.

The L3 cache 70 and/or the L3 controller 185 (or any other device, controller or processor) includes a plurality of processing controllers 195, each of which is connected to a pipeline processing system 200 including a pipeline controller 220. Each processing controller 195 is configured to perform a specific processing function within the cache controller 185 and/or cache 70, such as receiving commands, forwarding commands, accessing the cache memory, receiving and forwarding commands from an I/O port, updating protocols, generating alerts and others. Various processing controllers 195 are utilized during an operation that is executed in response to a request from a component of the network 100.

Each processing controller 195 includes or is associated with a memory or memory area 205 (i.e., subcontroller memory) that can hold various instructions 210 for performing various processing functions during execution of an operation, which are to be processed in a pipeline 212. The subcontroller memory 205 may include a number of registers or other memory structures to hold the instructions 210. In one embodiment, each register or subcontroller memory 205 includes a number of pipe fields holding various instructions or command data. For example, each instruction 210 may be stored and presented in a plurality of instruction fields. Examples of such instruction fields include command fields, controller identification fields, source and target identification fields, mode fields and others.

In one embodiment, the pipeline processing system 200 includes an arbiter 215 configured to decide access and control the input of successive instructions 210 into the pipeline controller 220 and the pipeline 212. The arbiter 215 and/or the pipeline controller 220, in one embodiment, inputs successive instructions 210 into the pipeline 212 in response to pulse signals from a clock, corresponding to clock cycles. A new instruction 210 may be input into the pipeline 212 at the start of each clock cycle The pipeline processing system include an encoded pipeline bus 225 or other communication device connected to each processing controller 195 and configured to allow the pipeline processor 200 to communicate the results of a pipe pass for an associated instruction 210. In the event that the pipe pass was unable to be successfully completed, this pipeline bus 225 serves to notify the controller 195 of the reason that the pipe pass was unsuccessful. The bus logic is encoded so that the pipeline controller 220 can communicate whether an instruction 210 was successfully processed and also communicate a type of error (such as a parity error) if the instruction could not be processed.

In one embodiment, the pipeline controller 220 and/or pipeline processing system 200 includes centralized or shared error detection logic 230 in the pipeline 212 and/or pipeline bus logic that is configured to detect errors in the pipeline 212. For example, the error detection logic is a parity check logic. Each instruction value and/or field may include a parity bit (i.e., an odd parity bit or an even parity bit) to allow the error detection logic 230 to check each instruction 210 as it progresses through the pipeline 212. The error detection logic 230 detects any errors in an instruction 210 in the pipeline 212 and communicates those errors as error signals to the individual controller 195 associated with the instruction 210.

In one embodiment, the encoded result bus logic includes one or more hooks, or the bus logic is otherwise modified, to include various types of parity errors therein. For example, parity errors may be classified by type, such as the particular instruction field that the parity error was detected in. The error signals generated by the error detection logic 230 include an error or rejection condition indication identifying the error type, such as identifying the field in which the parity error occurred. In one embodiment, different codepoints in the error detection logic are defined for different types of errors, thus enabling the controller 195 to take the appropriate recovery action depending on the error type. Each controller 195 may include decoding and/or recovery logic 235 configured to receive the error signal including the rejection condition, decode the error signal, and take appropriate recovery actions.

FIG. 7 illustrates a method 300 of managing a pipeline, detecting errors in a pipeline and/or performing recovery actions for a pipeline. The method 300 includes one or more stages 301-305. Although the method 300 is described in conjunction with the L3C controller 185, the method 300 can be utilized in conjunction with any of the components and caches described herein, as well as with any device or system that utilizes pipeline processing.

In the first stage 301, the L3C controller 185 receives a request such as a data transfer request, i.e., a request to transfer data sent from a source location, such as a node, cache, processing unit or other component or remote device, to a destination location, such as the L3 cache 170. The requestors may be, for example, the cache 170, the L4 caches 120, the L2 caches 165, the L1 caches 160, the cores 155, and other nodes 105. Such requestors may be on the same and/or different central processors 115.

In the second stage 302, request data is sent to one or more of the processing controllers 195 as instructions 210 and is stored within each subcontroller 195 for pipeline processing.

In the third stage 303, the pipeline controller 220 fetches instructions 210 from various processing controllers 195, via for example, the arbiter 215 or based on some pipeline priority selection. The instructions 210 enter the pipeline 212 and the instruction information proceeds through the pipeline 212.

In the fourth stage 304, if a parity error in an instruction 210 occurs in the pipeline 212, the error logic 230 detects the parity error and generates an error signal. The error signal is sent to the controller 195 associated with the instruction 210. In one embodiment, the error signal includes an error type indication such as an encoded cancellation codepoint.

In the fifth stage 305, the error detection logic 230 communicates the parity error detected in the central pipeline logic to the requesting controller 195 via the pipeline bus 225 so that the controller 195 may initiate an appropriate recovery action. Examples of recovery actions include cancelling a requested operation, suspending and/or retrying the requested operation, and/or sending an alert message to a requestor or other component.

In the sixth stage 306, if no errors are detected, the instruction 210 is processed via the pipeline 212 and the results are written back to the subcontroller 195 or a message is provided to the subcontroller 195 to indicate that the instruction 210 has completed processing.

Stages 303-306 are repeated for each instruction 210 input into the pipeline 212 until the pipelined processing is complete.

The systems and methods described herein provide numerous advantages over prior art dataflow systems. Technical effects and benefits include providing a centralized error detection mechanism that allows individual controllers to perform recovery actions in response to parity errors occurring in a pipeline. This avoids the need to stop the entire pipeline processing system in response to a parity error occurring in the pipeline. Another advantage includes the elimination of error detection logic contained in each controller. Eliminating the many distributed pieces of error detection logic results in substantial savings in area utilization and power, while the centralized error detection and reporting ensures there is no loss of RAS characteristics.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
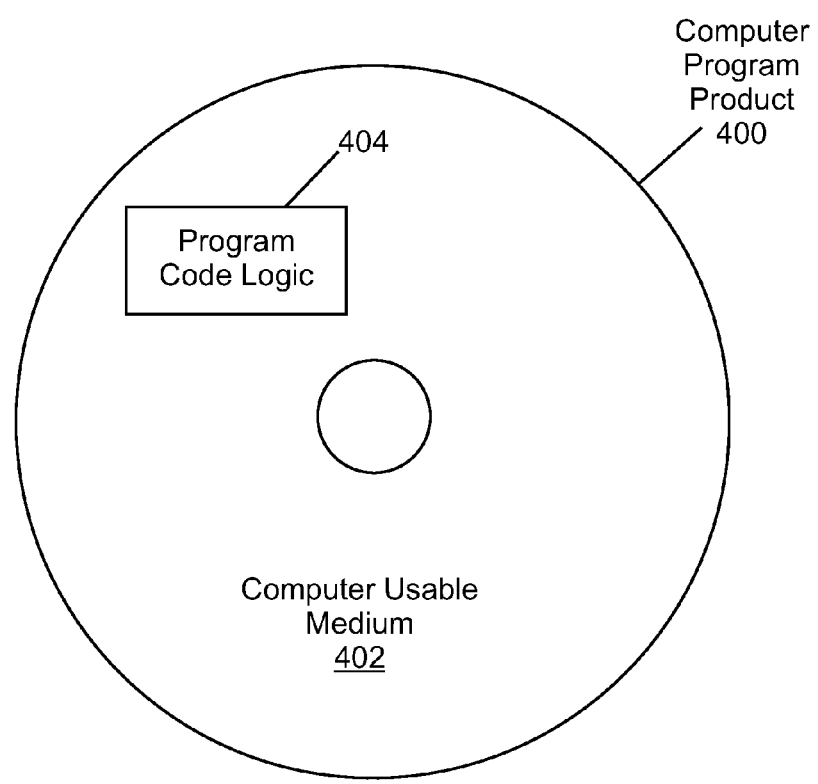
FIG. 8 depicts one embodiment of a computer program product incorporating one or more aspects of the present invention.

As described above, embodiments can be embodied in the form of computer-implemented processes and apparatuses for practicing those processes. In exemplary embodiments, the invention is embodied in a computer program product comprising a tangible storage medium. An example of a computer program product 400 as depicted in FIG. 8 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A pipelined processing device, comprising:
a processor configured to receive a request to perform an operation, the processor comprising:
a plurality of processing controllers configured to receive at least one instruction associated with the operation, each of the plurality of processing controllers including a memory to store at least one instruction therein;
a pipeline processor configured to receive and process the at least one instruction, the pipeline processor including error detection logic shared by each of the plurality of processing controllers, the shared error detection logic configured to check each instruction that passes through the pipeline processor, and detect a parity error in the at least one instruction as the at least one instruction is processed in a pipeline and generate an error signal; and
a pipeline bus connected to each of the plurality of processing controllers and configured to communicate the error signal from the error detection logic.

2. The device of claim 1, wherein the processor is configured to communicate a result of pipeline processing of the at least one instruction via the pipeline bus.

3. The device of claim 1, wherein the error signal is configured to indicate a type of parity error.

4. The device of claim 3, wherein the type of parity error includes an instruction field in which the parity error has occurred.

5. The device of claim 3, wherein the error detection logic includes a codepoint associated with each type of parity error.

6. The device of claim 1, wherein the processor includes a cache and the plurality of processing controllers include a plurality of cache controllers.

7. The device of claim 1, wherein each of the plurality of processing controllers includes recovery logic configured to receive the error signal and perform recovery actions in response to the error signal.

8. A method of pipeline processing, the method comprising:
- receiving a request to perform an operation at a processor;
- sending at least one instruction associated with the operation to each of a plurality of processing controllers, each of the plurality of processing controllers including a memory to store at least one instruction therein;
- receiving and processing the at least one instruction via a pipeline processor;
- checking each instruction that passes through the pipeline processor and detecting a parity error occurring in the at least one instruction as the at least one instruction is processed in a pipeline by error detection logic shared by each of the plurality of processing controllers; and
- generating an error signal indicating the parity error in the error detection logic and sending the error signal to a processing controller associated with the instruction via a pipeline bus.

9. The method of claim 8, wherein the processor is configured to communicate a result of pipeline processing of the at least one instruction via the pipeline bus.

10. The method of claim 8, wherein the error signal is configured to indicate a type of parity error.

11. The method of claim 10, wherein the type of parity error includes an instruction field in which the parity error has occurred.

12. The method of claim 10, wherein the error detection logic includes a codepoint associated with each type of parity error.

13. The method of claim 8, wherein the processor includes a cache and the plurality of processing controllers include a plurality of cache controllers.

14. The method of claim 8, further comprising receiving the error signal and performing recovery actions via recovery logic in the processing controller.

15. A computer program product for pipeline processing, comprising a non-transitory tangible storage medium readable by a processing circuit and storing instructions for execution by the processing circuit for performing a method comprising:
- receiving a request to perform an operation at a processor;
- sending at least one instruction associated with the operation to each of a plurality of processing controllers, each of the plurality of processing controllers including a memory to store at least one instruction therein;
- receiving and processing the at least one instruction via a pipeline processor;
- checking each instruction that passes through the pipeline processor and detecting a parity error occurring in the at least one instruction as the at least one instruction is processed in a pipeline by error detection logic shared by each of the plurality of processing controllers; and
- generating an error signal indicating the parity error in the error detection logic and sending the error signal to a processing controller associated with the instruction via a pipeline bus.

16. The computer program product of claim 15, wherein the processor is configured to communicate a result of pipeline processing of the at least one instruction via the pipeline bus.

17. The computer program product of claim 15, wherein the error signal is configured to indicate a type of parity error.

18. The computer program product of claim 17, wherein the type of parity error includes an instruction field in which the parity error has occurred.

19. The computer program product of claim 17, wherein the error detection logic includes a codepoint associated with each type of parity error.

20. The computer program product of claim 15, wherein the processor includes a cache and the plurality of processing controllers include a plurality of cache controllers.

* * * * *